United States Patent [19]

Toyoda et al.

[11] Patent Number: 4,988,934

[45] Date of Patent: Jan. 29, 1991

[54] ROBOT CONTROL APPARATUS

[75] Inventors: Kenichi Toyoda, Hino; Nobutoshi Torii, Hachioji; Ryo Nihei, Oshino; Jun Kikuchi, Hachioji, all of Japan

[73] Assignee: Fanuc Ltd., Minamitsuru, Japan

[21] Appl. No.: 332,272

[86] PCT. No.: JP88/00913
§ 371 Date: Mar. 22, 1989
§ 102(e) Date: Mar. 22, 1989

[87] Pub. No.: WO89/02623
Pub. Date: Mar. 23, 1989

[22] PCT Filed: Sept. 9, 1988
[22] Filed: Mar. 22, 1989

[30] Foreign Application Priority Data

Sep. 9, 1987 [JP] Japan ................................. 62-225598

[51] Int. Cl.$^5$ .................................................. G05B 19/42
[52] U.S. Cl. ............................. 318/568.15; 318/568.18; 318/616; 318/618; 318/636; 364/513
[58] Field of Search .................................. 318/560-638, 318/640, 636; 364/513; 901/15-24

[56] References Cited

U.S. PATENT DOCUMENTS

| 4,355,273 | 10/1982 | DuVall | 318/594 X |
|---|---|---|---|
| 4,453,221 | 6/1984 | Davis et al. | 364/513 |
| 4,486,693 | 12/1984 | Hamati et al. | 318/616 X |
| 4,506,335 | 3/1985 | Magnuson | 364/513 |
| 4,528,632 | 7/1985 | Nio et al. | 318/568.15 X |
| 4,546,443 | 10/1985 | Oguchi et al. | 318/568.18 X |
| 4,554,497 | 11/1985 | Nozawa et al. | 318/636 |
| 4,558,265 | 12/1985 | Hayashida et al. | 318/618 X |
| 4,627,009 | 12/1986 | Holmes et al. | 318/640 X |
| 4,683,543 | 7/1987 | Hirasawa et al. | 364/513 |
| 4,705,999 | 11/1987 | Soji et al. | 364/513 |
| 4,706,003 | 11/1987 | Nakashima et al. | 318/636 X |
| 4,771,389 | 9/1988 | Takahashi et al. | 364/513 |
| 4,829,219 | 5/1989 | Penkar | 318/568.18 |

Primary Examiner—Paul Ip
Attorney, Agent, or Firm—Staas & Halsey

[57] ABSTRACT

The robot control apparatus according to the present invention is so adapted that, with regard to all kinds of motions commanded of a robot, the maximum velocity and time constant conforming to the type of robot motion can be designated for respective robot control axes (3) by a controller (1) which includes a selection table memory (4).

4 Claims, 1 Drawing Sheet

ROBOT CONTROL APPARATUS

DESCRIPTION

1. Technical Field

This invention relates to a robot control apparatus which performs teaching/playback-type position control with regard to a robot having a plurality of drive axes.

2. Background Art

The basic operation in ordinary teaching/playback-type robot control comprises a teaching operation, in which the robot is first moved manually, by using a teaching pendant, to store motion point position information and tasks to be performed at these points in the data memory of a controller, an editing operation, in which the taught subjected matter stored in the data memory, namely the robot command data, is altering using an MDI & CRT unit, etc., of the controller, and a playback operation and automatic running performed after the teaching and editing operations.

In the playback operation and automatic running phase, a predetermined velocity command is applied to a drive mechanism of each controlled axis of the robot hand, thereby controlling the drive of these mechanisms simultaneously so that a predetermined task can be accomplished. With regard to the traveling velocity of the robot arm at such time, motion velocity can be decided as a ratio with respect to the maximum velocity, which is set for the robot arm, by an override function at the time of manual feed and by a motion velocity modification command and a set value of override at the time of playback operation. The reason for this is that it is required that the traveling velocity of the hand be suitably altered, in dependence upon the task performed by the robot, at automatic running and playback.

When teach data for each drive axis is decided in dependence upon the attitude of the robot arm with regard to taught starting and end points in the foregoing conventional robot control apparatus, there are occasions where, depending upon the motion, the load acting upon a motor during the motion exceeds the maximum output of a motor. Consequently, at the time of the teaching operation, it is required that a motion velocity modification command be set in such a manner that the load which will act upon the motor during the motion will fall within an allowable value range to lower the motion velocity. This places an excessive burden upon the operator as far as performing the teaching operation is concerned.

Conversely, depending upon the motion to be taught, there are times when the load acting upon the motor falls below the maximum output of the motor even though the robot arm moves at the set maximum velocity. The reason for this is that in a conventional robot control apparatus, the maximum velocity of motion and the acceleration/deceleration time constant along each drive axis are fixed at constant values at all times regardless of the type of robot motion performed.

More specifically, if a robot arm is capable of being driven at a higher velocity and, moreover, with a shorter time constant, whenever necessary, the maximum velocity and time constant cannot be changed even though motion at the higher speed becomes possible. Consequently, the improvement in robot efficiency is not satisfactory.

DISCLOSURE OF THE INVENTION

The present invention has been devised in order to solve the foregoing problems and its object is to provide a robot control apparatus in which the maximum velocity and time constant of each axial motor are decided for each and every taught motion to simplify the teaching operation and raise the motion speeds.

In accordance with the present invention, there can be provided a robot control apparatus for controlling a plurality of drive axes simultaneously by outputting a drive command to a motor having an acceleration/deceleration function, comprising memory means for storing teach data which stipulates a type of motion of a robot arm from a starting point to an end point, arithmetic means for deciding maximum velocity and an acceleration/deceleration time constant along each drive axis in such a manner that a load which will act upon each axial motor will attain a maximum output of the respective motor during motion between taught points, and command means for forming, from the stored teach data, a drive command for each axial motor within the decided maximum velocity and having the respective acceleration/deceleration time constant.

Accordingly, the robot control apparatus of the invention is such that the velocity and time constant of the motor for each axis are selected based on the attitudes of the robot at the taught starting point and end point, so that position can be controlled by forming control commands of a robot, which has a plurality of drive axes, for higher velocity and a shorter time constant.

BEST MODE FOR CARRYING OUT THE INVENTION

An embodiment of the present invention will now be described in detail with reference to the drawings.

Figure 1:
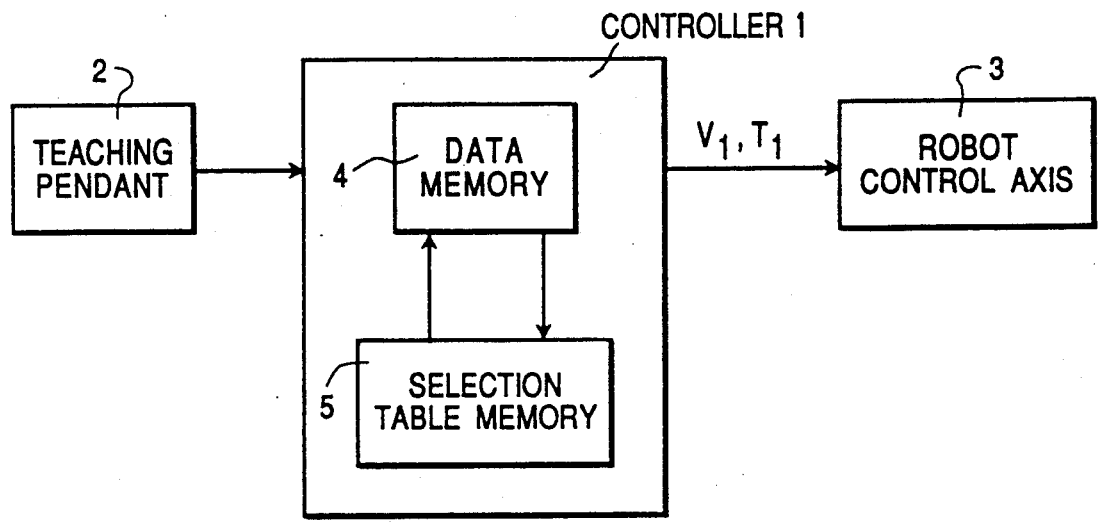
FIG. 1 is a view showing the general construction of a robot control apparatus according to the present invention.

The robot control apparatus shown in FIG. 1 is equipped with a controller 1 and a teaching pendant 2. With regard to robot control axes 3, a plurality of motors which read in drive commands via acceleration/deceleration circuits of variable time-constant type are controlled by a controller 1.

The controller 1 comprises a data memory 4 for storing what is taught, namely robot command data, and a selection table memory 5 for storing a velocity and acceleration/deceleration time constant of each motor of the robot control axes 3, wherein velocity and time constant are selected based on the robot command data in the data memory 4. Registered beforehand in the selection table memory 5 upon taking into consideration motion conditions (movement attitude, external load, etc.) are a maximum value of velocity and an acceleration/deceleration time constant which will allow motor torque necessary for a motion to attain the maximum output possessed by the motor.

Figure 2:
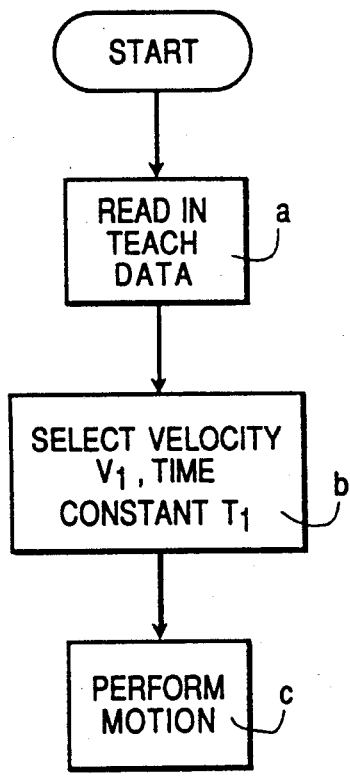
FIG. 2 is a flowchart illustrating the flow for drive command computation performed by a controller.

FIG. 2 is a flowchart illustrating the flow for drive command computation performed by the controller 1. When the teach data enters from the teaching pendant 2, the attitudes of the robot arm at starting and end points regarding each motion are given (step a), and maximum velocity $V_1$ for each axis and a corresponding time constant $T_1$ are read out of the selection table memory 5 in conformity with the given attitudes (step b). The robot arm is driven in accordance with the maximum velocity V and time constant T selected (step c).

It should be noted that, instead of using the selection table memory 5, an arrangement can be adopted in which computation formulae for velocity $V_i$ and time constant $T_i$ set by a coefficient conforming to motor load are stored in advance, and computations are performed successively with regard to the various axes based on the teach data from the teaching pendant 2.

Further, an arrangement is permissible in which plural sets of maximum velocity V and time constant T are previously stored in the selection table memory 5 with respect to the same motion conditions, a maximum velocity stipulating actual motion is computed from time constant data read out at step b, and a different set of data is selected if the computed maximum velocity is less than a selected maximum velocity. With such an expedient, it is possible to select a shorter time constant if the distance between the starting and end points is small.

Though an embodiment of the invention has been described, the invention is not limited thereto but can be modified in various ways without departing from the scope of the claims.

Industrial Applicability

The present invention is capable of providing a robot control apparatus in which maximum velocity and acceleration/deceleration time constant are changed and set in such a manner that a load acting upon a motor during a motion will attain the maximum output of the motor for each and every motion between taught points, and drive of the robot arm is capable of being controlled based on the set maximum velocity and time constant so that teaching efficiency and robot operating efficiency can be improved.

We claim:

1. A robot control apparatus for controlling a plurality of drive axes simultaneously by outputting a drive command to a motor having an acceleration/deceleration function, comprising:
   memory means for storing teach data which stipulates a type of motion of a robot arm from a starting point to an end point;
   arithmetic means for deciding maximum velocity and an acceleration/deceleration time constant along each drive axis in that a load which will act upon each axial motor will attain a maximum output of the respective motor during motion between taught points; and
   command means for forming, from said stored teach data, a drive command for each axial motor within said decided maximum velocity and having the respective acceleration/deceleration time constant.

2. A robot control apparatus according to claim 1, characterized in that said arithmetic means decides a maximum velocity and an acceleration/deceleration time constant based on a selection formula set for every axial motor.

3. A robot control apparatus according to claim 1, characterized in that said arithmetic means has a memory for storing a selection table which decides a maximum velocity and an acceleration/deceleration time constant set for every axial motor.

4. A robot control apparatus according to claim 3, characterized in that said memory has a plurality of selection tables for different maximum velocities, wherein if a maximum velocity at the time of a motion does not attain a set maximum velocity, said arithmetic means decides a maximum velocity by a different selection table.

* * * * *